F. A. MacCALLUM.
PROTECTOR FOR ELECTRIC CIRCUITS.
APPLICATION FILED APR. 3, 1917.
1,252,919.
Patented Jan. 8, 1918.
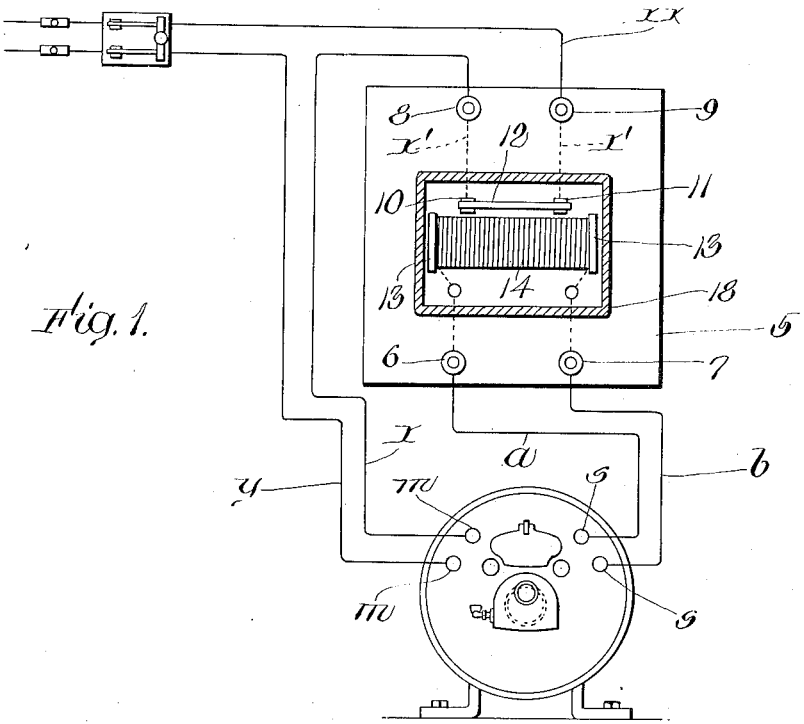
Fig. 1.
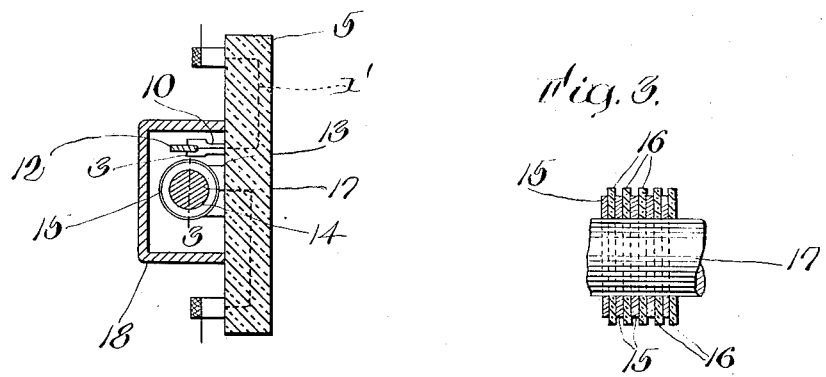
Fig. 2.
Fig. 3.
Inventor:
Frank A. MacCallum.
By Henry J. Miller
atty.

UNITED STATES PATENT OFFICE.

FRANK A. MacCALLUM, OF BROOKLINE, MASSACHUSETTS.

PROTECTOR FOR ELECTRIC CIRCUITS.

1,252,919.  Specification of Letters Patent.  Patented Jan. 8, 1918.

Application filed April 3, 1917. Serial No. 159,412.

*To all whom it may concern:*

Be it known that I, FRANK A. MacCALLUM, a citizen of the United States, and a resident of Brookline, county of Norfolk and State of Massachusetts, have invented an Improved Protector for Electric Circuits, of which the following is a specification; reference being had to the accompanying drawings, forming part thereof.

This invention has reference to an improved protective device for electric circuits and particularly to such a device adapted to afford protection to the main electric circuit or winding of a split phase electric motor.

One object of the invention is to protect one electric circuit or winding through the generation of heat in an element of another electric circuit or winding.

Another object of the invention is to provide means whereby the main electric circuit or winding of a split phase induction electric motor may be protected when the starting circuit or winding remains in circuit unduly.

Other objects of the invention will appear from the following description.

The invention consists in providing the circuit to be protected with an element adapted to be disrupted by heat and providing another circuit with an electric resistance unit through the heating of which heat is supplied to fuse said element to open said first mentioned circuit.

The invention also consists in such other novel features of construction and combination of parts as shall hereinafter be more fully described and pointed out in the claim.

Figure 1, represents a front elevation partly in section, as on line 1—1 Fig. 2, of the improved protective device applied to the electric circuits of an electric motor of the split phase induction type.

Fig. 2, represents a sectional view of parts of the same taken on line 2—2 Fig. 1.

Fig. 3, represents a detail sectional view of a part of the heating coil taken on line 3—3 Fig. 2.

Similar characters of reference designate corresponding parts throughout.

Electric motors of split phase induction type are usually supplied with electric starting windings or circuits (so called) to which electric current is supplied initially by induction and with main electric windings or circuits which are in direct connection with the exterior power circuits. If the electric current continues to pass through the starting winding for an undue length of time after its office has been performed there is considerable danger that the circuit will be destroyed. I find however that the starting winding may remain in circuit for a short time during the operation of the armature without danger of burning out and I take advantage of this fact by supplying the starting circuit or winding with an electric resistance unit or element which during the passage of current therethrough under normal conditions becomes somewhat heated whereby if current continues to pass through such starting winding after the expiration of a normal period of time such resistance element very soon becomes overheated, and I utilize this excess of radiated heat in acting upon a fusible member in circuit with the main electric circuit or winding whereby said fusible member may be melted or disrupted by said exterior heat.

As shown in the drawings M indicates any ordinary electric split phase induction motor having its starting winding electrically connected with the binding posts $s, s$ from which electric conductors $a, b$ extend and its main winding connected with the binding posts $m, m$ from which the electric conductors $x, y$ extend.

The improved protector is placed at a convenient point and is mounted on the base 5 of slate or other suitable fire proof material. Binding posts 6, 7 are mounted on said base 5 to receive the electric conductors $a, b$ and similar posts, 8, 9 are mounted on said base 5. On said base 5 are also mounted the binding posts 10, 11 which are spaced apart and carry the fusible element 12 which preferably is of solder or material adapted to be fused, disrupted or acted upon by a suitable temperature, approximately 155° to effect the opening of the electric circuit between said posts 10 and 11. These posts 10 and 11 are connected by the electric conductors $x', x'$ with the posts 8 and 9 and, of these latter, post 8 is electrically connected with electric conductor $x$ and post 9 with the main electric conductors X, X.

Adjacent the fusible or thermostatic element 12 are mounted on the base 5 the supports 13, 13 for the heating coil 14 which consists of a helix of flat wire adapted to resist the passage of electric current, the coils of this element being electrically insulated by means of plaster of Paris, isinglass or other fireproof of non-burnable electric insulating material 16 carried by the fire proof core 17 of electric insulation. In order to confine the heat from the coil 14 around the fusible element 12 I provide the box or casing 18.

It is to be understood that the element 12 is of a size and nature to be acted upon by heat radiated from the coil 14 to effect the opening of the electric circuit under the presence of an abnormal temperature. Said element 12 is in fact a thermostatic element as distinguished from a thermo electric element adapted to be fused by an attack from an electric current of abnormal intensity or volume.

When the electric circuit X, x—x, y is supplied with electric current the course of said current includes the thermostatic element 12 and the main winding of the armature of motor M and the induced electric starting current is generated in the starting winding of said motor including the electric circuit a—b and the electric resistance element 15 which latter becomes somewhat heated. Under normal conditions the electric current generated in the starting winding and said circuit will be cut out before said element 15 becomes unduly heated, but if, for any reason, said starting circuit remains in circuit the element 15 will become so heated that the heat radiated therefrom, and confined by the casing 18, will operate on said element 12, specifically, to effect the disruption or fusing of said element 12 whereby the main electric circuit is broken or opened at or between the posts 10 and 11.

Having thus described my invention I claim as new and desire to secure by Letters Patent—

The combination with an electric motor having a main winding, a main electric circuit connected with said main winding, and a starting winding having an electric circuit exterior of said motor, of a fusible electric conductor included in said main circuit, and an electric heater included in said exterior circuit of said starting winding, and disposed to supply heat to said fusible conductor.

FRANK A. MacCALLUM.